(12) United States Patent
Schumacher et al.

(10) Patent No.: US 6,486,566 B1
(45) Date of Patent: Nov. 26, 2002

(54) CIRCUIT FOR MONITORING THE IGNITION SYSTEM FOR A SAFETY DEVICE IN AN AUTOMOBILE

(75) Inventors: Hartmut Schumacher, Freiberg (DE); Guenter Schirmer, Reutlingen (DE); Frank Werner, Lichtenstein (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/600,798
(22) PCT Filed: Dec. 18, 1998
(86) PCT No.: PCT/DE98/03724
§ 371 (c)(1),
(2), (4) Date: Oct. 10, 2000
(87) PCT Pub. No.: WO99/37508
PCT Pub. Date: Jul. 29, 1999

(30) Foreign Application Priority Data

Jan. 21, 1998 (DE) .......................... 198 02 042

(51) Int. Cl.$^7$ .............................................. B60R 21/32
(52) U.S. Cl. .................. 307/10.1; 180/282; 280/735
(58) Field of Search .......... 307/10.1; 324/705, 324/706; 280/734, 735; 180/271, 282; 327/95

(56) References Cited

U.S. PATENT DOCUMENTS 3,883,795 A * 5/1975 Klein et al. .............. 324/392
4,845,377 A * 7/1989 Swart ..................... 307/10.1
5,373,193 A * 12/1994 Nilsson et al. ............ 280/735
5,389,822 A * 2/1995 Hora et al. ............... 280/735
5,515,027 A * 5/1996 Billig et al. .............. 180/271
5,522,617 A * 6/1996 Swart ..................... 180/282
5,646,454 A * 7/1997 Mattes et al. ............. 180/282
5,726,887 A * 3/1998 Spies et al. ............... 280/735
5,936,313 A * 8/1999 Cook et al. ............... 180/282

FOREIGN PATENT DOCUMENTS

| EP | 0 338 413 | 10/1989 |
|---|---|---|
| EP | 0 577 988 | 1/1994 |
| EP | 0 701 928 | 3/1996 |
| WO | WO 90/02673 | * 3/1990 |

* cited by examiner

Primary Examiner—Brian Sircus
Assistant Examiner—Roberto J. Rios
(74) Attorney, Agent, or Firm—Kenyon & Kenyon

(57) ABSTRACT

A circuit with which errors in the triggering circuit can be very reliably detected has a transistor bridge circuit in whose shunt arm a triggering arrangement and a capacitor are arranged. A measured current source is connected to the transistor bridge circuit. A controller controls the transistors and the measured current source during a monitoring cycle so that the capacitor is charged by a measured current. A sample-and-hold circuit controlled by the controller measures, after the capacitor has been charged, a first voltage drop across the triggering circuit and, after the measured current has been turned off, a second voltage drop across the triggering circuit so that the controller can determine the resistance of the triggering arrangement and the capacitance from these two voltages.

8 Claims, 2 Drawing Sheets

CIRCUIT FOR MONITORING THE IGNITION SYSTEM FOR A SAFETY DEVICE IN AN AUTOMOBILE

BACKGROUND INFORMATION

The present invention relates to a circuit for monitoring the triggering circuit of a safety device in a motor vehicle, the triggering circuit having a triggering arrangement representing an ohmic resistance, which are connected in series with a capacitor, and a switching arrangement for charging and discharging the capacitor, and with a measuring device being present which determines the voltage drop across the triggering circuit in order to therefrom determine the resistance of the triggering arrangement and the capacitance.

Such an alternating current triggering of ignitors for airbags or seat belt tensioners is described in European Published Patent Application No. 577 988. In order to guarantee fail-safe operation of the triggering circuit of a safety device in the event of a crash, the triggering circuit must be continuously monitored. If a defect is found in the triggering circuit, this is signaled in the vehicle visually or acoustically. In practice, the following defects may occur in the triggering circuit: a short circuit may occur between the ignitor and the battery voltage or the ground. In addition, parallel connections may occur between the leads of the triggering circuit itself or parallel to the triggering circuit capacitor. According to the monitoring circuit known from European Published Patent Application 577 988, the voltage drops across the triggering circuit are measured during the different charging states of the capacitor in the triggering circuit and it is determined from the value of the voltage whether the ignitor or the capacitor is defective. International Published Patent Application No. WO 90/02673 also describes a triggering system in which a triggering circuit having a triggering arrangement and a capacitor connected in series therewith can be connected to a supply voltage via two switches. To check the resistance of the triggering arrangement and the capacitance in the triggering circuit, the capacitor is charged to different voltages in a plurality of switching cycles of the switch. The charging voltages picked up at a measuring resistor are measured, and the discharge time constant is determined. From these two quantities is determined, via comparison with reference values in a control circuit, whether or not the triggering circuit is defective.

SUMMARY OF THE INVENTION

According to the features of claim 1, the triggering means and the capacitor of the triggering circuit are arranged in a shunt arm of the transistor bridge circuit. A measured current source is connected to this transistor bridge circuit. A controller controls the transistors and a measured current source during the monitoring cycle so that the capacitor is charged by a measured current. A sample-and-hold circuit controlled by the controller detects, after the capacitor has been charged, a first voltage drop across the triggering circuit and, after the measured current has been turned off, a second voltage drop across the triggering circuit, so that the controller can determine the resistance of the triggering arrangement and the capacitance from these two voltages.

With this circuit arrangement, the measuring circuit voltages applied to the triggering circuit can be measured quickly and accurately, so that a defect in the triggering circuit can be determined in a highly reliable manner. The use of a transistor bridge has the advantage that, even in the event of a single-sided short circuit of the transistor bridge with the supply voltage, the safety device can still be ignited. The transistor bridge also has a more uniform heat load on the individual transistors. An external resistor of the triggering circuit, such as known from the related art, is not needed in the arrangement according to present invention which increases the energy transfer to the ignitor per unit of time.

Thus the measured current source includes a series circuit of a switching transistor and a measuring resistor which is connected to the shunt arm of the transistor bridge circuit, as well as to a point of the transistor bridge circuit connected to a supply voltage. A diode can be connected in series with the switching transistor for polarity reversal protection.

The controller synchronously controls the switching transistor of the measured current source and the switch of the sample-and-hold circuit. At the input of the sample-and-hold circuit there is an operational amplifier, whose output current flows via the switch, and a current switched through by the switch is supplied to an amplifier, which has a storage capacitor in a feedback branch. The output of the sample-and-hold circuit is fed back to an input of the operational amplifier. The switch of the sample-and-hold circuit can be a transmission gate transistor. The input stage of the amplifier may have one or more MOS transistors.

DETAILED DESCRIPTION

Figure 1:
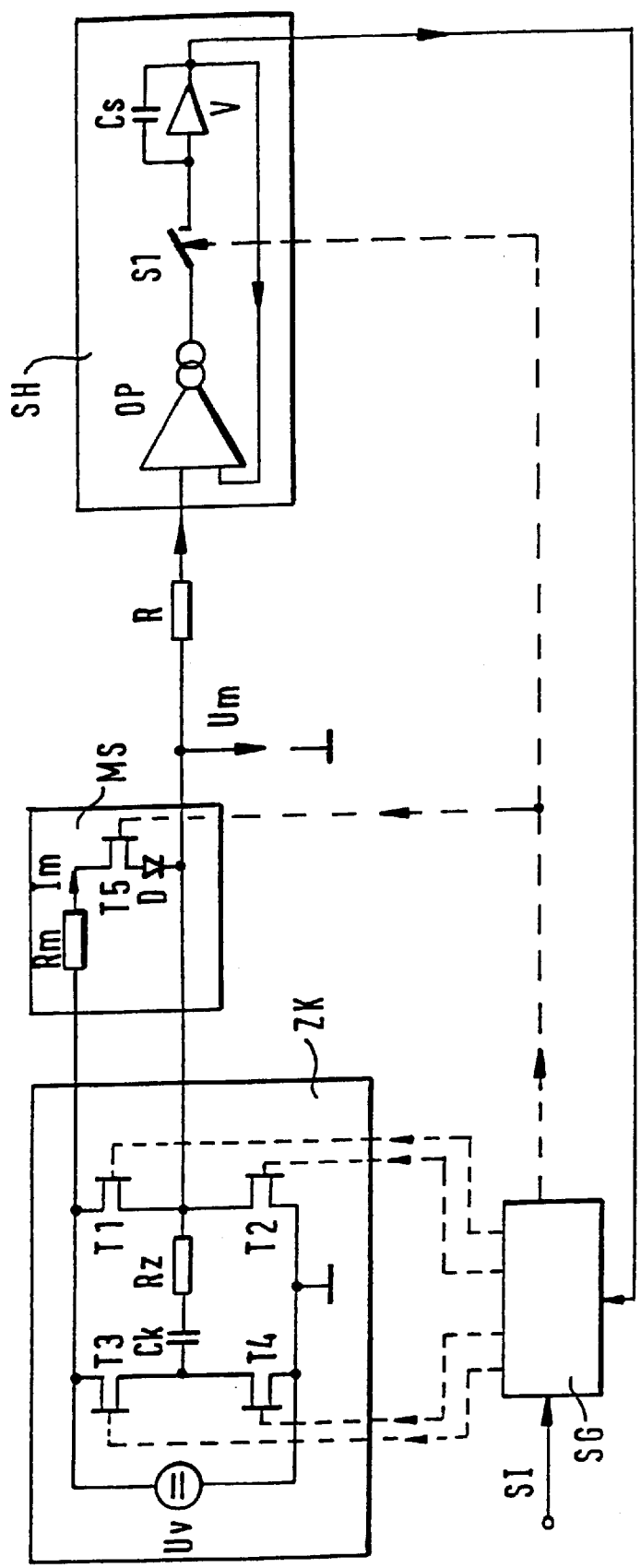
FIG. 1 shows a wiring diagram of the monitoring circuit for the triggering circuit of a safety system.

The drawing represented in FIG. 1 has four functional groups: a triggering circuit ZK, a measured current source MS, a sample-and-hold circuit SH, and a controller SG. Controller SG receives one or more input signals SI from one or more acceleration sensors or crash sensors. If, after an analysis of input signals SI, it is determined that restraining devices (for example airbags or seat belt tensioners) are to be triggered, the controller issues an appropriate control signal to triggering circuit ZK, which then initiates the triggering of the restraining devices. The analysis of input signals SI in controller SG is not described in detail here, since it is not the object of the present invention.

The triggering circuit has a transistor bridge circuit connected to a supply voltage Uv. The transistor bridge circuit has, in the embodiment illustrated, four transistors (for example, field-effect transistors) T1, T2, T3, and T4. In the shunt arm of the transistor bridge circuit there is a triggering arrangement (ignitor) having an ohmic resistance Rz. A capacitor Ck is connected in series with this ignitor resistor Rz. The transistor bridge circuit provides two alternative options for supplying a triggering current to ignitor resistor Rz. Distinction is made between normal operation and push-pull operation. In normal operation, where voltage Uv is large (for example, 45 V), transistors T1 and T2 are alternatingly activated, transistor T4 being permanently activated and transistor T3 being blocked. Or, alternatively, transistors T3 and T4 can be alternatingly activated with transistor T2 permanently activated and transistor T1 blocked. In push-pull operation, where voltage Uv is small (for example, battery voltage of the vehicle), the triggering current goes from voltage source Uv either to ignitor resistor Rz when transistors T3 and T2 are conducting and transistors T1 and T4 are off or when transistors T1 and T4 are conducting and transistors T3 and T2 are off. Thus sufficient energy can be supplied to the ignitor even with a reduced voltage Uv.

Since the activation combinations of transistors T1, T2, T3, and T4 take place alternatingly in the respective operating modes—normal or push-pull operation—, a triggering current flow is guaranteed even if one terminal of the triggering circuit is subjected to a short circuit.

In order to activate transistors T1, T2, T3, T4, control signals are sent by controller SG to the control electrodes of transistors T1, T2, T3, and T4. The control signal lines are shown in FIG. 1 by dashed lines.

In a periodically repeated monitoring cycle for the triggering circuit, initially only transistor T4 becomes conducting and all of the other transistors T1, T2, and T3 are turned off. After a measured current source MS, which is connected to the terminal between transistors T1 and T2, as well as to supply voltage Uv of the transistor bridge circuit, has been turned on, a measured current Im flows through the series circuit of ignitor resistor Rz and capacitor Ck. Measured current source MS has a measuring resistor Rm connected in series with a switching transistor T5. It is advantageous if a diode D is also connected in series with switching transistor T5 for polarity reversal protection in order to protect switching transistor T5 from being damaged by excessive voltages occurring during triggering.

Figure 2:
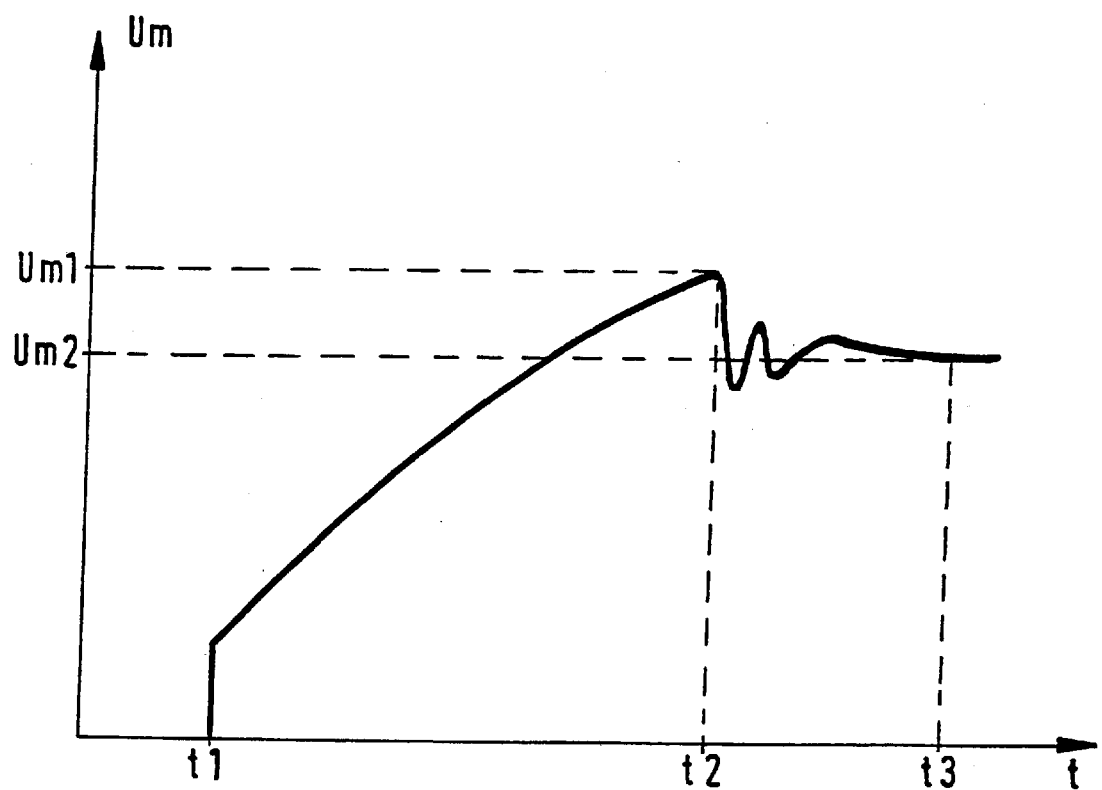
FIG. 2 shows the variation of the charging status of a capacitor in the circuit.

A measuring circuit voltage Um can be picked up at the output of measured current source MS. The variation of measuring circuit voltage Um during the measuring sequence is shown in FIG. 2. At one point in time t1, switching transistor T5, controlled by controller SG, is made conductive. Measured current Im that flows as a result goes through ignitor Rz and charges capacitor Ck. After capacitor Ck has been charged to a certain extent at time t2, measuring circuit voltage Um has increased to a value Um1. At this time t2, switching transistor T5 is turned off again. Measuring circuit voltage Um decreases by the voltage drop across the ohmic components of the triggering circuit. As FIG. 2 shows, a decaying oscillation of measuring circuit voltage Um occurs due to inductances present in the leads. Measuring circuit voltage Um2 is only measured at a point in time t3 when the oscillation has completely decayed.

Sample-and-hold circuit SH measures measuring circuit voltages Um1, Um2, applied at times t2, t3, and forwards them to controller SG. At the input of sample-and-hold circuit SH there is an operational amplifier OP, at whose inverting input measuring circuit voltage Um is applied via a resistor R. The output current of operational amplifier OP is supplied to an amplifier V, feedback-connected to a storage capacitor Cs, via an electrically controllable switch S1. The output of the amplifier is fed back to the positive input of operational amplifier OP. At time t1, switch SI of sample-and-hold circuit SH, controlled by controller SG, is closed synchronously with switching transistor T5. Switch S1 and switching transistor T5 are also synchronously opened at time t2. At the output of amplifier V, measuring circuit voltage Um1 is then available. In order to measure second measuring circuit voltage Um2, switch S1 is actuated again at time t3.

Since operational amplifier OP acts upon switch S1 as a current source, the switch can be designed with a transmission gate transistor (having an n-channel and a p-channel MOS transistor). Due to the small geometric dimensions of transmission gate transistors, only a minimal charge coupling to storage capacitor Cs occurs during the switching sequence due to the very low parasitic transistor capacitances.

Since current is supplied at the output of operational amplifier OP, the high internal resistance of switch S1 causes no disadvantageous delays. The internal resistance of switch S1 is high, since its transistors are selected to be very small in order to avoid parasitic capacitances. The source current from operational amplifier OP is not measurably reduced by the internal resistance of switch S1.

Amplifier V has one or more MOS transistors in the input stage. Therefore no discharge of storage capacitor Cs may occur and thus the measuring circuit voltage can be stored without errors and. MOS inputs require no static current to be activated but are voltage-controlled. Therefore storage capacitor Cs cannot be charged or discharged due to an input current of amplifier V.

The resistance of ignitor Rz and capacitance Ck of the triggering circuit are determined by controller SG from the two measuring circuit voltages Um1 and Um2 as follows:

The resistance of ignitor Rz is obtained from the difference between measuring circuit voltages Um1 and Um2, measured current Im and resistance Rd of switching transistor T4:

$$Rz = \frac{Um1 - Um2}{Im} - Rd$$

Measured current Im is obtained from supply voltage Uv, measuring circuit voltage Um, and measuring resistance Rm:

$$Im = \frac{Uv - Um}{Rm}$$

It can be assumed that resistances Rd of transistors T2 and T4 of the transistor bridge circuit are the same. Thus resistance Rd can be determined in a simple manner as transistors T2 and T5 become conductive while all the other transistors T1, T3, and T4 remain blocked. Then resistance Rd is calculated from voltage drop Um across transistor T2 and measured current Im:

$$Rd = \frac{Um}{Im}$$

Capacitance Ck is calculated from the difference of the two switching times t2, t1 of measuring circuit voltage Um2 and measured current Im:

$$Ck = \frac{t2 - t1}{Um2} Im$$

If the determined values for ignitor resistance Rz and for capacitance Ck are within the defined values stored in controller SG, error-free operation of the triggering circuit can be assumed. If those values exceed or drop below the predefined limits, an undesirable short circuit or an interruption of the triggering circuit line may have occurred, which is signaled as an error.

What is claimed is:

1. A circuit for triggering a safety device in a motor vehicle and for monitoring a triggering of the safety device, comprising:
   a triggering circuit including:
      a transistor bridge circuit including transistors and a shunt arm,
      a triggering arrangement corresponding to an ohmic resistance, and a capacitor connected in series with the triggering arrangement, the triggering arrangement and the capacitor being arranged in the shunt arm, and the capacitor being charged and discharged through the transistor bridge circuit;

a measured current source connected to the transistor bridge circuit;

a controller for controlling the measured current source and the transistors of the transistor bridge circuit during a monitoring cycle so that the capacitor is initially charged by a measured current and subsequently discharged; and a sample-and-hold circuit controlled by the controller, wherein:
the sample-and-hold circuit measures a first voltage drop across the triggering circuit after the capacitor has been charged and a second voltage drop across the triggering circuit after the measured current source has been turned off, so that the controller is capable of determining the resistance of the triggering arrangement and a capacitance of the capacitor from the first voltage drop and the second voltage drop.

2. The circuit according to claim 1, wherein:

the measured current source includes a switching transistor and a measuring resistor connected in series, and the switching transistor and the measuring resistor are connected to the shunt arm of the transistor bridge circuit and to a point of the transistor bridge circuit connected to a supply voltage.

3. The circuit according to claim 2, further comprising:

a diode connected in series with the switching transistor, wherein:
the diode provides a polarity reversal protection.

4. The circuit according to claim 2, wherein:

the controller synchronously activates the switching transistor and a switch of one of the plurality of sample-and-hold circuits.

5. The circuit according claim 1, further comprising:

an operational amplifier for providing an output current that flows through a switch of one of the plurality of sample-and-hold circuits and being located at an input of one of the plurality of sample-and-hold circuits; and a second amplifier to which is supplied the output current switched through by the switch, the second amplifier including a storage capacitor in a feedback arm.

6. The circuit according to claim 5, wherein:

an output of one of the plurality of sample-and-hold circuits is feedback-coupled to an input of the operational amplifier.

7. The circuit according to claim 5, wherein:

the switch includes a transmission gate transistor.

8. The circuit according to claim 5, wherein:

an input stage of the second amplifier includes at least one MOS transistor.

* * * * *